US008275059B2

(12) United States Patent
Koo et al.

(10) Patent No.: US 8,275,059 B2
(45) Date of Patent: Sep. 25, 2012

(54) FREQUENCY SYNCHRONIZATION APPARATUS AND METHOD IN OFDM SYSTEM

(75) Inventors: Bon Young Koo, Gyunggi-do (KR); Hyung Jin Choi, Seoul (KR); Se Bin Im, Gyunggi-do (KR); Jung In Kim, Gyunggi-do (KR)

(73) Assignees: Samsung Electro-Mechanics Co., Ltd., Gyunggi-do (KR); Sungyunkwan University Foundation for Corporate Collaboration, Gyunggi-do (KR)

( * ) Notice: Subject to any disclaimer, the term of this patent is extended or adjusted under 35 U.S.C. 154(b) by 781 days.

(21) Appl. No.: 12/477,269

(22) Filed: Jun. 3, 2009

(65) Prior Publication Data

US 2010/0142632 A1   Jun. 10, 2010

(30) Foreign Application Priority Data

Dec. 4, 2008   (KR) .................. 10-2008-0122324

(51) Int. Cl.
    *H04L 27/28*   (2006.01)
(52) U.S. Cl. ........................... 375/260; 455/45
(58) Field of Classification Search .............. 375/260; 455/45
    See application file for complete search history.

(56) References Cited

U.S. PATENT DOCUMENTS

| | | | | |
|---|---|---|---|---|
| 7,289,765 B2* | 10/2007 | Okada et al. | ................ | 455/45 |
| 7,602,852 B2* | 10/2009 | Berkeman et al. | ............ | 375/260 |
| 7,733,971 B2* | 6/2010 | Roh et al. | ................ | 375/260 |
| 2007/0110174 A1* | 5/2007 | Glazko et al. | ................ | 375/260 |

* cited by examiner

*Primary Examiner* — David Ometz
*Assistant Examiner* — Fitwi Hailegiorgis
(74) *Attorney, Agent, or Firm* — Lowe, Hauptman, Ham & Berner, LLP

(57) ABSTRACT

A frequency synchronization apparatus includes: a correlating unit that obtains a first correlation value by correlating a known reference guard interval of an OFDM symbol and a reference copy interval corresponding to the reference guard interval, and obtains a second correlation value by correlating the estimate guard interval and an estimate copy interval corresponding to the estimate guard interval; a determining unit that compares the first and second correlation values to determine a first case where the first correlation value is larger by a pre-set magnification than the second correlation value, a second case where the second correlation value is larger by a pre-set magnification than the first correlation value, and a third case which is not the first case nor the second case; and a frequency offset estimating unit that estimates a frequency offset by using a correlation value corresponding to any one of the first to third.

14 Claims, 6 Drawing Sheets

FREQUENCY SYNCHRONIZATION APPARATUS AND METHOD IN OFDM SYSTEM

CROSS-REFERENCE TO RELATED APPLICATIONS

This application claims the priority of Korean Patent Application No. 2008-0122324 filed on Dec. 4, 2008, in the Korean Intellectual Property Office, the disclosure of which is incorporated herein by reference.

BACKGROUND OF THE INVENTION

1. Field of the Invention

The present invention relates to a frequency offset estimating apparatus and method applicable for a digital television receiver and, more particularly, to a frequency synchronization apparatus and method in an orthogonal frequency division multiplexing (OFDM) system for estimating a frequency offset by using a correlation value according to an echo channel, a delay path with effective power, to reduce inter-symbol interference (ISI), to thereby improve degradation of estimation performance of the frequency offset.

2. Description of the Related Art

In general, an OFDM system is disadvantageous in that it is sensitive to a frequency offset generated due to mismatching of a Doppler shift or a transmitter/receiver oscillator in a radio channel.

The frequency offset ruins orthogonality of subcarriers with respect to a reception signal to cause an inter-carrier interference (ICI) phenomenon, and affects the amplitude as well as a phase rotation of signals. In addition, Distortion of the amplitude brings about an effect that the signal is scattered like noise even in an environment without noise, aggravating the signal distortion.

Therefore, in order to maintain a stable system performance in the OFDM system, frequency synchronization should be precisely performed, and in order to precisely perform frequency synchronization, a frequency offset should be precisely estimated.

FIG. 1 is a view illustrating the related art frequency offset estimating method.

With reference to FIG. 1, the related art frequency offset estimating method uses the fact that a guard interval 11 and a rear portion 13 of an effective symbol interval 12 are alike (equivalent) in an OFDM symbol 10 of a time domain, based on which a frequency offset is estimated through a phase variation in the two intervals.

A frequency offset estimated according to the related art frequency offset estimating method may be represented by Equation 1 shown below:

$$\hat{\varepsilon} = \frac{1}{2\pi} \arctan\{y^*[n-N_{GI}]y[n+N-N_{GI}]\} \quad \text{[Equation 1]}$$

In Equation 1, 'N' is the size of a fast Fourier transform (FFT), $N_{GI}$ is the size of the guard interval, * is a conjugate complex number, 'k' is the number of accumulated symbols, and $\hat{\varepsilon}$ is the estimated frequency offset.

FIG. 2 is a graph of a delay profile obtained by simply modeling an echo channel.

With reference to FIG. 2, a root mean square error (RMSE) performance in the absence of echo in a considered channel environment is shown by G1 (Power=1:0) and G2 (Power=0.5:0), and an RMSE performance in the presence of echo is shown by G3 (Power=0.5:0.5).

However, the related art frequency offset estimating method has a problem in that the performance is drastically degraded if echo exists compared with the case without echo.

SUMMARY OF THE INVENTION

An aspect of the present invention provides a frequency synchronization apparatus and method in an orthogonal frequency division multiplexing (OFDM) system capable of improving degradation of estimating performance of a frequency offset by estimating the frequency offset by using a correlation value according to an echo channel, a delay path with effective power, to reduce an inter-symbol interference (ISI), thus significantly improving frequency synchronization performance.

According to an aspect of the present invention, there is provided a frequency synchronization apparatus in an OFDM system, including: a correlating unit that obtains a first correlation value by correlating a known reference guard interval of an OFDM symbol and a reference copy interval corresponding to the reference guard interval, sets an estimate guard interval from a pre-set point of the reference guard interval, and obtains a second correlation value by correlating the estimate guard interval and an estimate copy interval corresponding to the estimate guard interval; a determining unit that compares the first and second correlation values to determine a first case where the first correlation value is larger by a pre-set magnification than the second correlation value, a second case where the second correlation value is larger by a pre-set magnification than the first correlation value, and a third case which is not the first case nor the second case; and a frequency offset estimating unit that estimates a frequency offset by using a correlation value corresponding to any one of the first to third cases determined by the determining unit.

The correlating unit may set a pre-set point, a start point of the estimate guard interval, as a middle point of the reference guard interval.

The determining unit may determine the first case if a square value of the first correlation value is larger by more than double than a square value of the second correlation value, may determine the second case if the square value of the second correlation value is larger by more than double than the square value of the first correlation value, and may determine the third case if it does not fall under the first case nor the second case.

The frequency offset estimating unit may take an arc tangent for correlation values accumulated by an accumulating unit, and multiply $$\frac{1}{2\pi}$$

thereto to estimate the frequency offset.

According to another aspect of the present invention, there is provided a frequency synchronization apparatus in an OFDM system, including: a correlating unit that obtains a first correlation value by correlating a known reference guard interval of an OFDM symbol and a reference copy interval corresponding to the reference guard interval, sets an estimate guard interval from a pre-set point of the reference guard interval, and obtains a second correlation value by correlating the estimate guard interval and an estimate copy interval corresponding to the estimate guard interval; a determining unit that compares the first and second correlation values to determine a first case where the first correlation value is larger by a pre-set magnification than the second correlation value, a second case where the second correlation value is larger by a pre-set magnification than the first correlation value, and a third case which is not the first case nor the second case; an accumulating unit that accumulates the first correlation value by the pre-set symbol accumulation number in the event of the first case, accumulates the second correlation value as the pre-set symbol accumulation number in the event of the second case, and accumulates a value obtained by adding the first and second correlation values by the pre-set symbol accumulation number in the event of the third case; and a frequency offset estimating unit that estimates a frequency offset by using the correlation values accumulated by the accumulating unit.

The correlating unit may set the pre-set point, a start point of the estimate guard interval, as a middle point of the reference guard interval.

The determining unit may determine the first case if a square value of the first correlation value is larger by more than double than a square value of the second correlation value, may determine the second case if the square value of the second correlation value is larger by more than double than the square value of the first correlation value, and may determine the third case if it does not fall under the first case nor the second case.

The accumulating unit may set the symbol accumulation number for accumulating the first correlation value or the second correlation value as 4.

The frequency offset estimating unit may take an arc tangent for the correlation values accumulated by the accumulating unit, and multiply $$\frac{1}{2\pi}$$

thereto to estimate the frequency offset.

According to still another aspect of the present invention, there is provided a frequency synchronization method in an OFDM system, including: a correlating step of obtaining a first correlation value by correlating a known reference guard interval of an OFDM symbol and a reference copy interval corresponding to the reference guard interval, setting an estimate guard interval from a pre-set point of the reference guard interval, and obtaining a second correlation value by correlating the estimate guard interval and an estimate copy interval corresponding to the estimate guard interval; a determining step of comparing the first and second correlation values to determine a first case where the first correlation value is larger by a pre-set magnification than the second correlation value, a second case where the second correlation value is larger by a pre-set magnification than the first correlation value, and a third case which is not the first case nor the second case; an accumulating step of accumulating the first correlation value in the event of the first case, accumulating the second correlation value in the event of the second case, and accumulating a value obtained by adding the first and second correlation values in the event of the third case; and a frequency offset estimating step of estimating a frequency offset by using the correlation values accumulated in the accumulating step.

In the correlating step, the pre-set point, a start point of the estimate guard interval, may be set as a middle point of the reference guard interval.

In the determining step, if a square value of the first correlation value is larger by more than double than a square value of the second correlation value, it may be determined to be the first case, if the square value of the second correlation value is larger by more than double than the square value of the first correlation value, it may be determined to be the second case, and if it is not the first nor the second case, it may be determined to be the third case.

In the accumulating step, the symbol accumulation number for accumulating the first correlation value or the second correlation value may be set as 4.

In the frequency offset estimating step, an arc tangent is taken for the correlation values accumulated in an accumulating step, to which $$\frac{1}{2\pi}$$

is multiplied to estimate the frequency offset.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
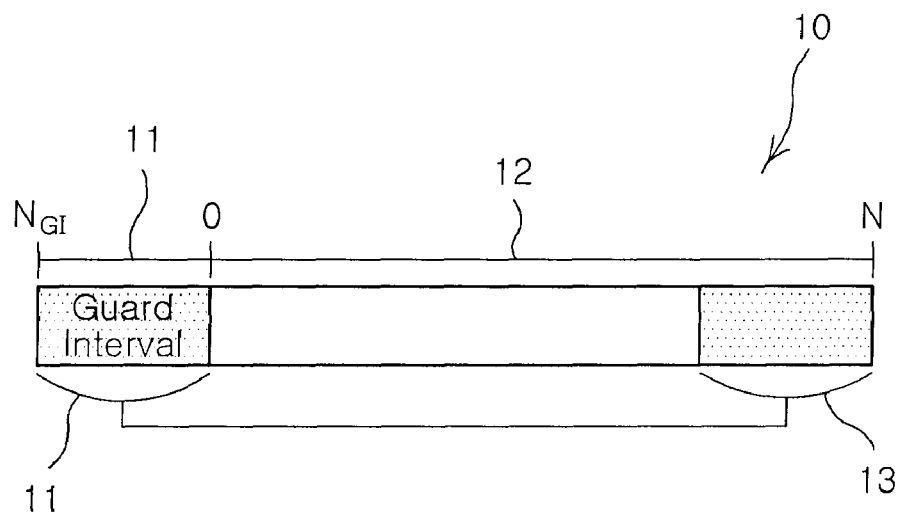
FIG. 1 is a view illustrating the related art frequency offset estimating method.
Figure 2:
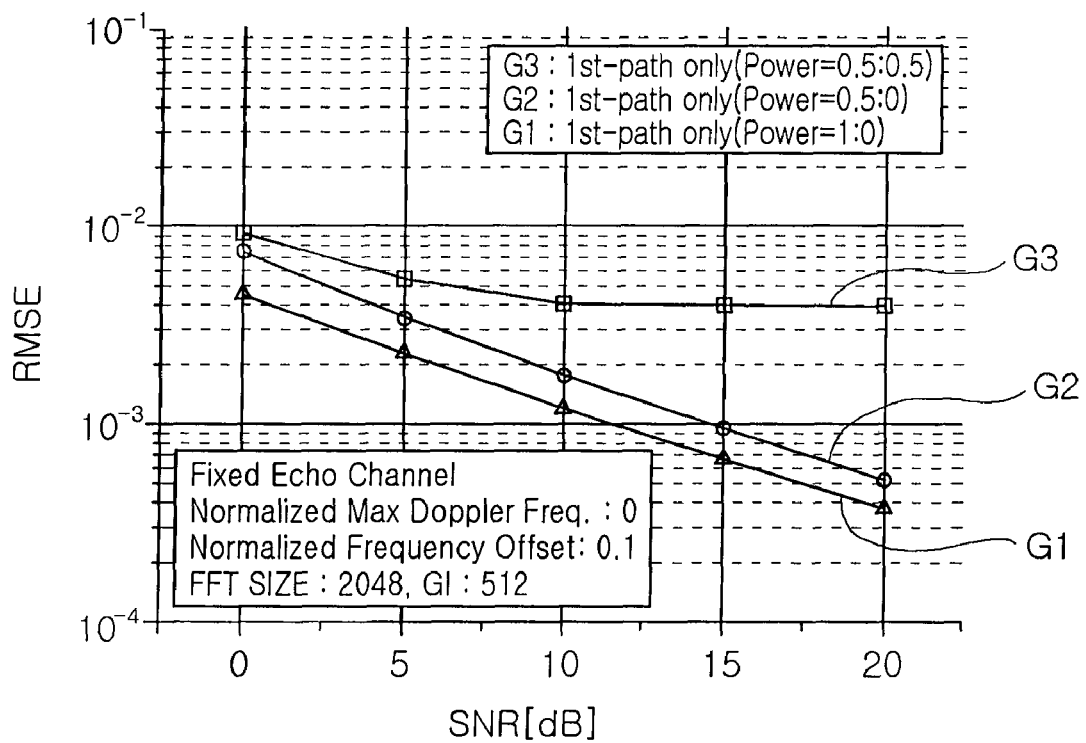
FIG. 2 is a graph of RMSE performance according to the related art frequency offset estimating method.

Exemplary embodiments of the present invention will now be described in detail with reference to the accompanying drawings. The invention may however be embodied in many different forms and should not be construed as limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 3:
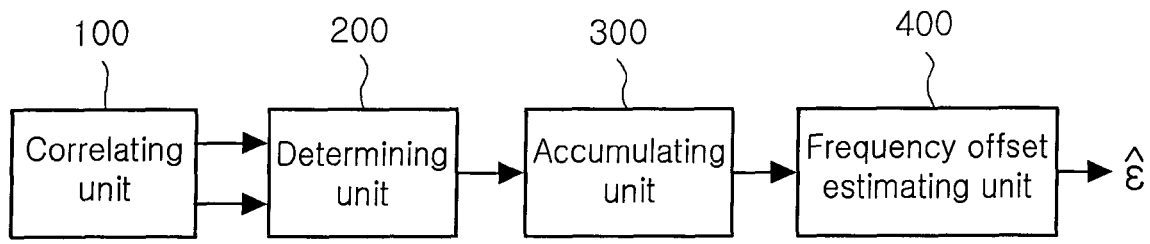
FIG. 3 is a schematic block diagram of a frequency offset estimating apparatus according to an embodiment of the present invention.

FIG. 3 is a schematic block diagram of a frequency offset estimating apparatus according to an embodiment of the present invention.

With reference to FIG. 3, the frequency offset estimating apparatus according to an embodiment of the present invention may include a correlating unit 100 for obtaining a first correlation value Rm[0] by correlating a known reference guard interval of an OFDM symbol and a reference copy interval corresponding to the reference guard interval, setting an estimate guard interval from a pre-set point of the reference guard interval, and obtaining a second correlation value Rm[τ] by correlating the estimate guard interval and an estimate copy interval corresponding to the estimate guard interval, a determining unit 200 for comparing the first correlation value Rm[0] and the second correlation value Rm[τ] to determine a first case in which the first correlation value Rm[0] is larger by a pre-set magnification than the second correlation value Rm[τ], a second case in which the second correlation value Rm[τ] is larger by the pre-set magnification than the first correlation value Rm[0], and a third case which is not the first case nor the second case, and a frequency offset estimating unit 400 for estimating a frequency offset by using a correlation value corresponding to one of the first to third cases determined by the determining unit 200.

The frequency offset estimating apparatus according to an embodiment of the present invention may include a correlating unit 100 for obtaining a first correlation value Rm[0] by correlating a known reference guard interval of an OFDM symbol and a reference copy interval corresponding to the reference guard interval, setting an estimate guard interval from a pre-set point of the reference guard interval, and obtaining a second correlation value Rm[τ] by correlating the estimate guard interval and an estimate copy interval corresponding to the estimate guard interval, a determining unit 200 for comparing the first correlation value Rm[0] and the second correlation value Rm[τ] to determine a first case in which the first correlation value Rm[0] is larger by a pre-set magnification than the second correlation value Rm[τ], a second case in which the second correlation value Rm[τ] is larger by the pre-set magnification than the first correlation value Rm[0], and a third case which is not the first case nor the second case, an accumulating unit 300 for accumulating the first correlation value Rm[0] by the pre-set symbol accumulation number in the event of the first case, accumulating the second correlation value by the pre-set symbol accumulation number in the event of the second case, and accumulating a value obtained by adding the first correlation value Rm[0] and the second correlation value Rm[τ] by the pre-set symbol accumulation number in the event of the third case, and a frequency offset estimating unit 400 for estimating a frequency offset by using the correlation values accumulated by the accumulating unit 300.

Here, 'm' in the first correlation value Rm[0] and the second correlation value Rm[τ] refers to a symbol index.

The frequency offset estimating unit 400 of the frequency offset estimating apparatus according to an embodiment of the present invention may obtain a frequency offset by using the correlation value from the determining unit 200 without using the accumulating unit 300. In this case, the accumulating unit 300 is not necessary. However, accumulating correlation values from the determining unit 200 by using the accumulating unit 300 enables more accurate frequency offset estimation.

The correlating unit 100 obtains the first correlation value Rm[0] by correlating the known reference guard interval of an OFDM symbol and the reference copy interval corresponding to the reference guard interval, sets the estimation guard interval from a pre-set point of the reference guard interval, and obtains the second correlation value Rm[τ] by correlating the estimate guard interval and the estimate copy interval corresponding to the estimate guard interval.

The determining unit 200 compares the first correlation value Rm[0] and the second correlation value Rm[τ] and determines the first case in which the first correlation value Rm[0] is larger by a pre-set magnification than the second correlation value Rm[τ], the second case in which the second correlation value Rm[τ] is larger by the pre-set magnification than the first correlation value Rm[0], and the third case which is not the first case nor the second case.

The accumulating unit 300 accumulates the first correlation value Rm[0] by the pre-set symbol accumulation number in the event of the first case, accumulates the second correlation value Rm[τ] by the pre-set symbol accumulation number in the event of the second case, and accumulates a value obtained by adding the first correlation value Rm[0] and the second correlation value Rm[τ] by the pre-set symbol accumulation number in the event of the third case, The frequency offset estimating unit 400 estimates a frequency offset ($\hat{\epsilon}$) by using the correlation values accumulated by the accumulating unit 300.

Figure 4:
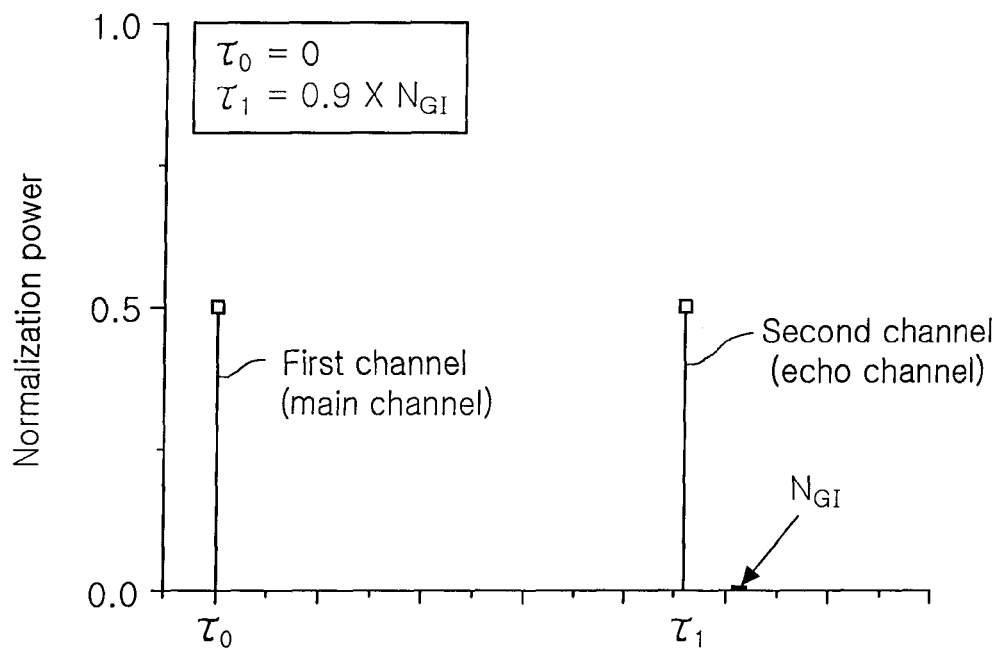
FIG. 4 is a graph of a delay profile obtained by modeling an echo channel according to an embodiment of the present invention.

FIG. 4 is a graph of a delay profile obtained by modeling an echo channel according to an embodiment of the present invention.

FIG. 4 shows a delay between a first channel (main channel) and a second channel (echo channel).

If time of the first channel is $\tau_0$ and time of the second channel is $\tau_1$, the difference ($\Delta\tau = \tau_0 - \tau_1$) between the time $\tau_0$ of the first channel and the time $\tau_1$ of the second channel corresponds to a delay time between the two channels.

In addition, for example, if the length of the guard interval is $$\frac{N_{GI}}{2},$$

time ($\tau_1$) of the second channel would be $0.9 * N_{GI}$.

Figure 5:
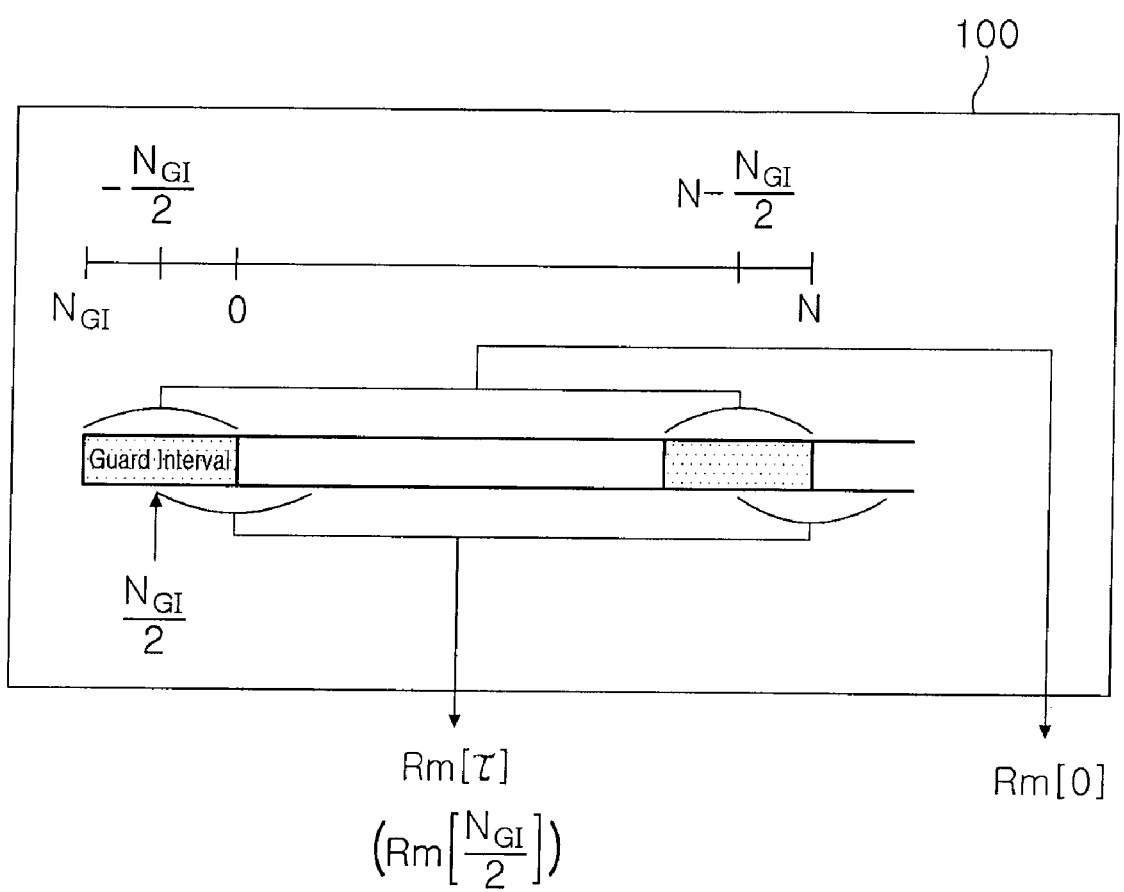
FIG. 5 is a conceptual view of a correlating unit according to an embodiment of the present invention.

FIG. 5 is a conceptual view of the correlating unit according to an embodiment of the present invention.

With reference to FIGS. 3 to 5, the correlating unit 100 may set the pre-set point $$\left(\frac{N_{GI}}{2}\right),$$

the start point of the estimate guard interval, as a middle point of the reference guard interval.

Figure 6:
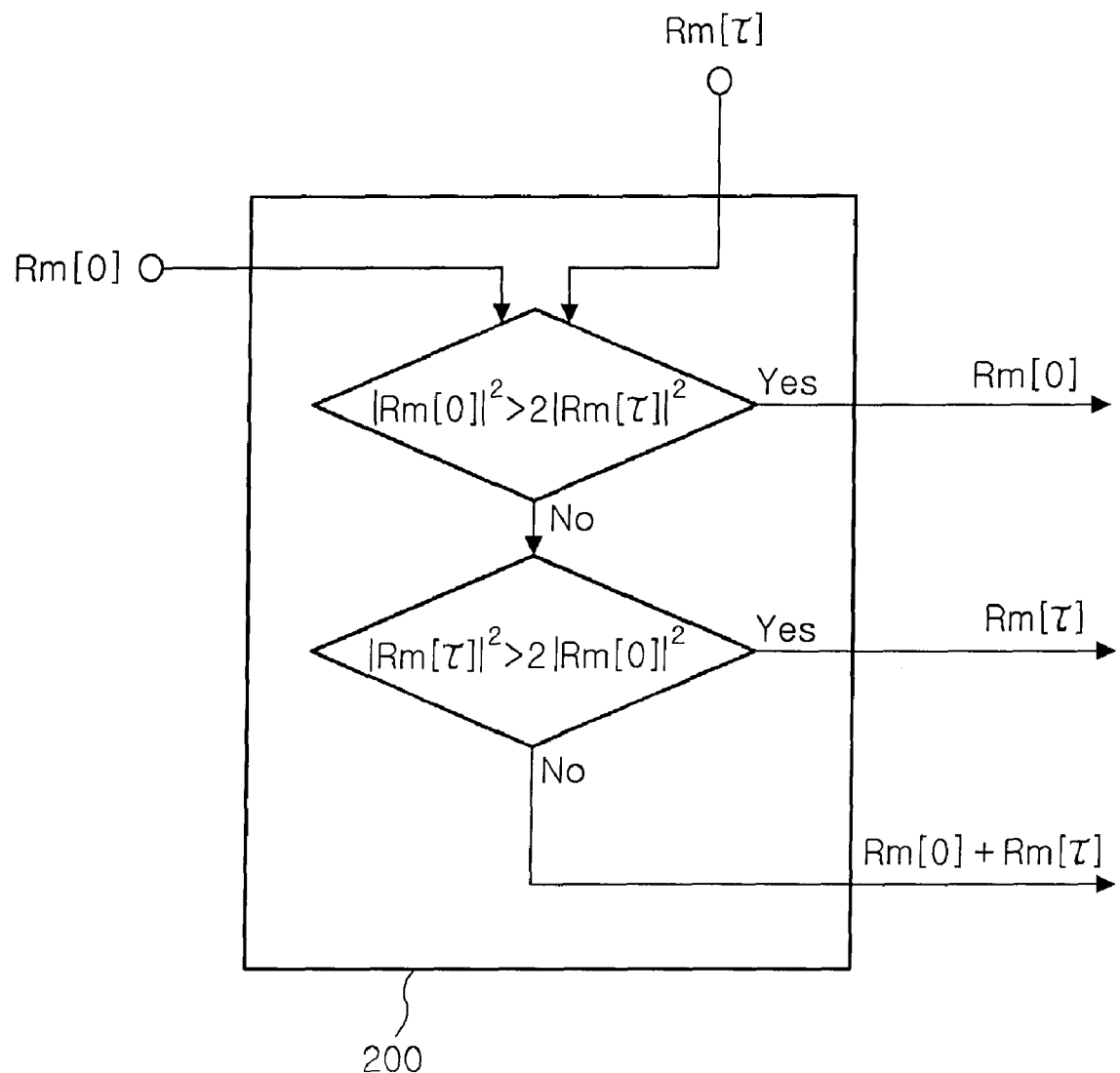
FIG. 6 is a view illustrating an operation process of a determining unit according to an embodiment of the present invention.

FIG. 6 is a view illustrating an operation process of the determining unit according to an embodiment of the present invention.

With reference to FIGS. 3 to 6, the determining unit 200 determines the first case if a square value of the first correlation value Rm[0] is larger by double than a square value of the second correlation value Rm[τ], determines the second case if the square value of the second correlation value Rm[τ] is larger by double than the square value of the first correlation value Rm[0], and determines the third case if it does not fall under the first case nor the second case.

The accumulating unit 300 may set the symbol accumulation number for accumulating the first correlation value Rm[0] or the second correlation value Rm[τ] as 4 corresponding to the pilot-repeated symbol number.

Figure 7:
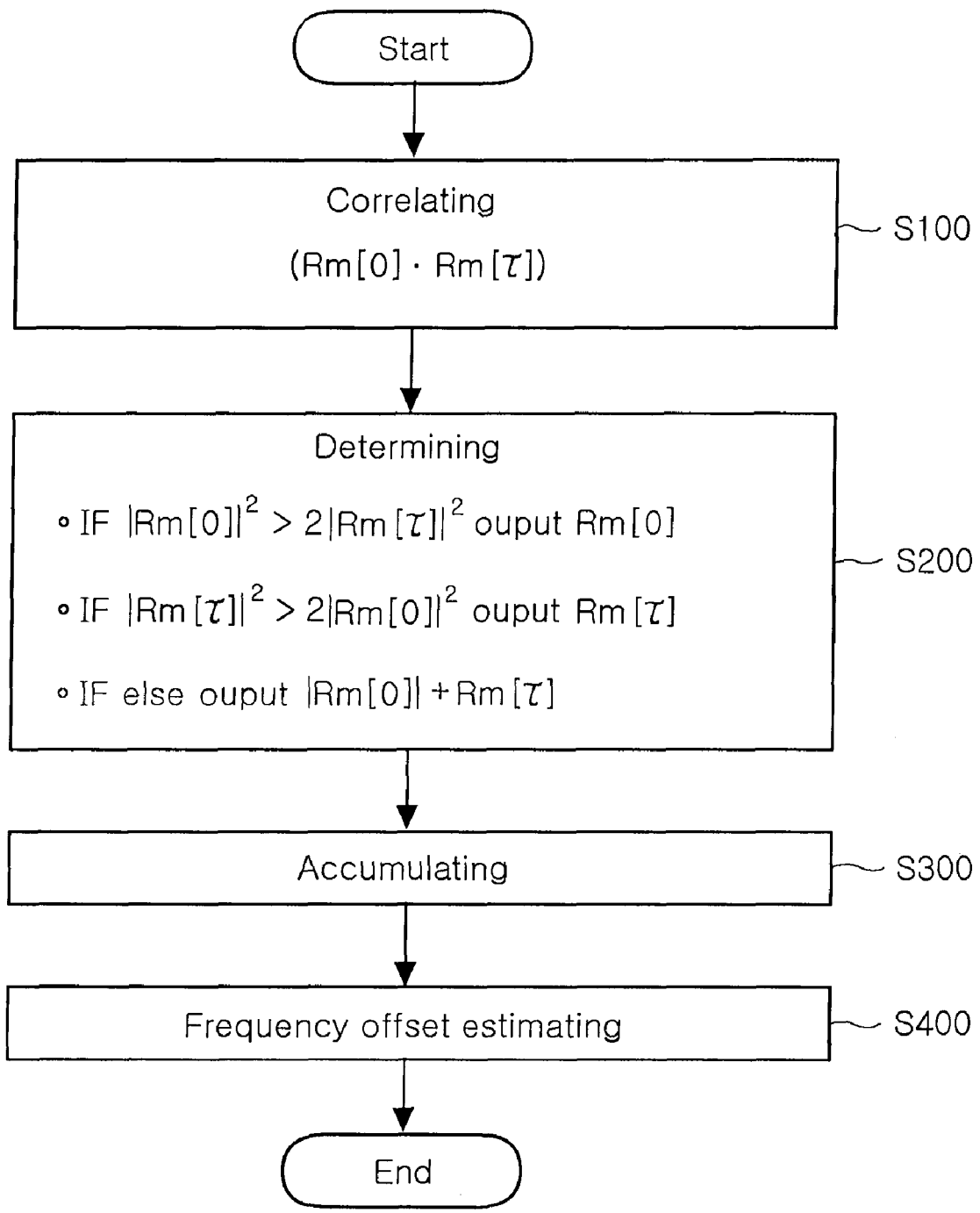
FIG. 7 is a flow chart illustrating a frequency offset estimating method according to an embodiment of the present invention.

The frequency offset estimating unit 400 takes an arc tangent for the correlation values accumulated by the accumulating unit 300, and multiplies $$\frac{1}{2\pi}$$

thereto to estimate the frequency offset ($\hat{\epsilon}$) as represented by Equation 3 shown below:

FIG. 7 is a flow chart illustrating a frequency offset estimating method according to an embodiment of the present invention.

With reference to FIGS. 3 to 7, the frequency offset estimating method according to an embodiment of the present invention includes a correlating step (S100), a determining step (S200), an accumulating step (S300), and a frequency offset estimating step (S400).

In the correlating step S100, the first correlation value Rm[0] is obtained by correlating a known reference guard interval of an OFDM symbol and a reference copy interval corresponding to the reference guard interval, an estimate guard interval is set from a pre-set point of the reference guard interval, and a second correlation value Rm[τ] is obtained by correlating the estimate guard interval and an estimate copy interval corresponding to the estimate guard interval.

In the determining step S200, the first correlation value Rm[0] and the second correlation value Rm[τ] are compared to determine the first case in which the first correlation value Rm[0] is larger by a pre-set magnification than the second correlation value Rm[τ], the second case in which the second correlation value Rm[τ] is larger by the pre-set magnification than the first correlation value Rm[0], and the third case which is not the first case nor the second case.

In the accumulating step S300, in the event of the first case, the first correlation value Rm[0] is accumulated, in the event of the second case, the second correlation value Rm[τ] is accumulated, and in the event of the third case, a value obtained by adding the first correlation value Rm[0] and the second correlation value Rm[τ] is accumulated.

In the frequency offset estimating step S400, the frequency offset ($\hat{\epsilon}$) is estimated by using the correlation values accumulated in the accumulating step S300.

In the correlating step S100, a pre-set point, a start point of the estimate guard interval, is set as a middle point of the reference guard interval.

In the determining step S200, if a square value of the first correlation value Rm[0] is larger by double than a square value of the second correlation value Rm[τ], it is determined as the first case, if the square value of the second correlation value Rm[τ] is larger by double than the square value of the first correlation value Rm[0], it is determined as the second case, and if it is not the first nor the second case, it is determined as the third case.

In the accumulating steep S300, the symbol accumulation number for accumulating the first correlation value Rm[0] or the second correlation value Rm[τ] may be set as 4.

In the frequency offset estimating step S400, an arc tangent is taken for the correlation values accumulated in the accumulating step S300, to which $$\frac{1}{2\pi}$$

is multiplied to estimate the frequency offset ($\hat{\epsilon}$)

Figure 8:
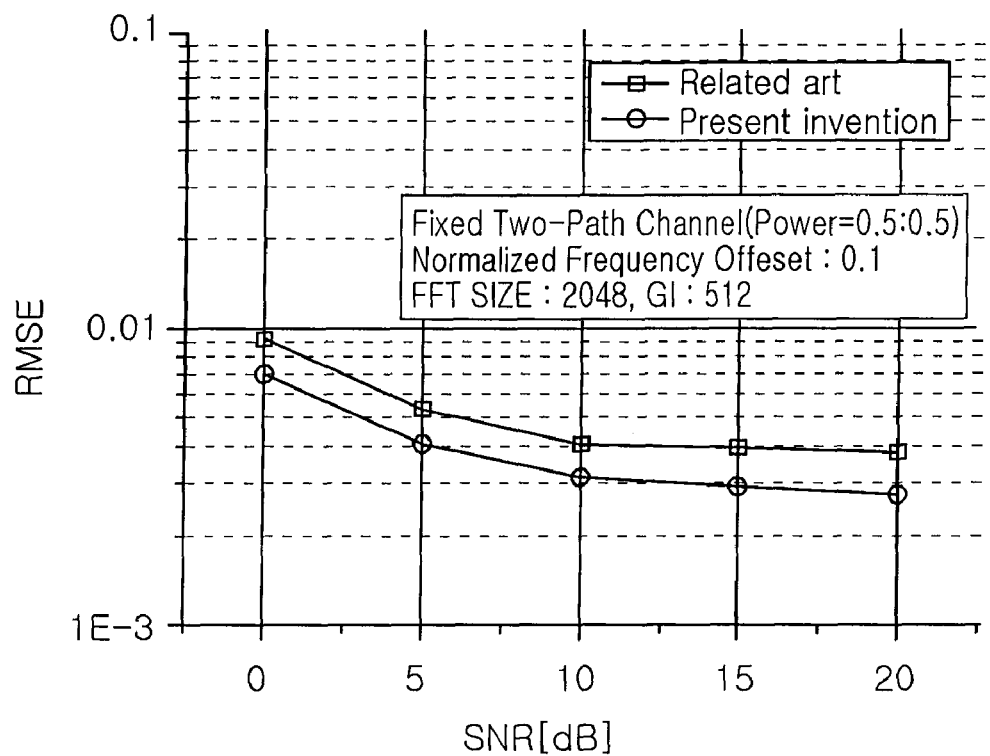
FIG. 8 is a graph of root mean square error (RMSE) performance over SNRs at a fixed two-path channel according to an embodiment of the present invention.
Figure 9:
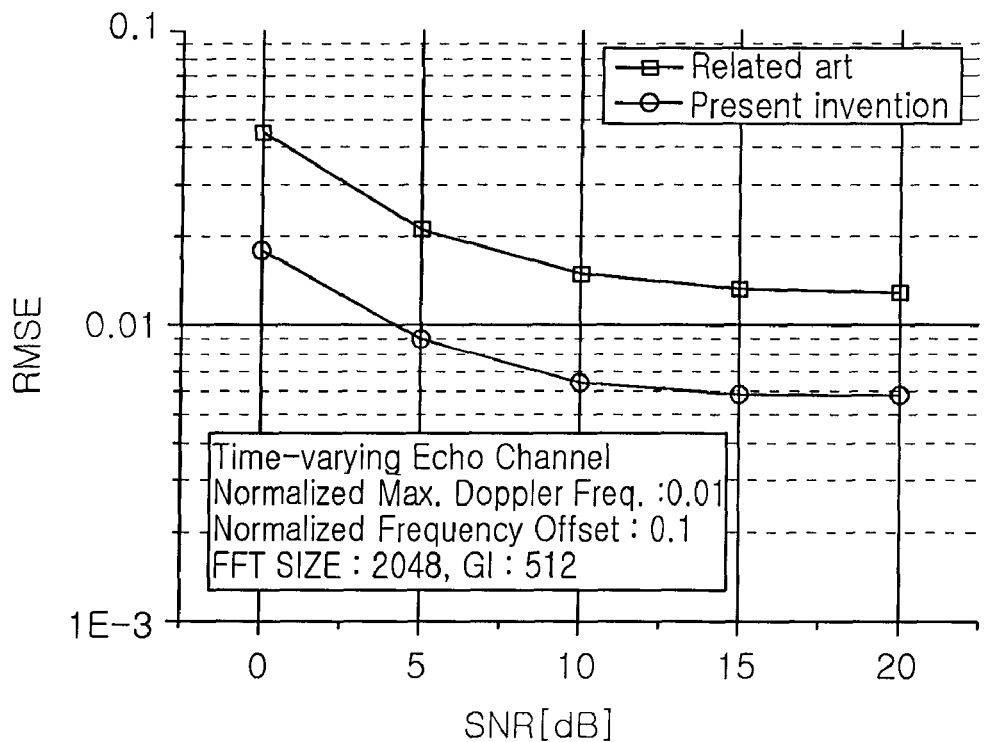
FIG. 9 is a graph of RMSE performance over SNRs at a time-varying echo channel according to an embodiment of the present invention.

A simulation was performed to verify the frequency offset estimating performance proposed by the frequency offset estimating technique of the present invention, in which the symbol accumulation number was set as 4 and numerous repeating processes were sufficiently performed in a fixed echo channel having fixed path power and a time-varying echo channel in which path power changes randomly. FIGS. 8 and 9 show the results of statistical performance numeric values of the simulation.

FIG. 8 is a graph of root mean square error (RMSE) performance over SNRs at the fixed two-path channel according to an embodiment of the present invention, and FIG. 9 is a graph of RMSE performance over SNRs at the time-varying echo channel according to an embodiment of the present invention.

With reference to the graph of FIG. 8, it is noted that, with respect to the fixed two-path channel, the RMSE of the present invention is lower than that of the related art. Also, with reference to FIG. 9, it is noted that, with respect to the time-varying echo channel, the RMSE of the present invention is lower than that of the related art.

The operation and effect of the present invention will now be described in detail.

With reference to FIGS. 3 to 9, the frequency offset estimating apparatus according to an embodiment of the present invention may include the correlating unit 100, the determining unit 200, the accumulating unit 300, and the frequency offset estimating unit 400.

The correlating unit 100 obtains the first correlation value Rm[0] by correlating the known reference guard interval of an OFDM symbol and the reference copy interval corresponding to the reference guard interval, sets the estimation guard interval from a pre-set point of the reference guard interval, and obtains the second correlation value Rm[τ] by correlating the estimate guard interval and the estimate copy interval corresponding to the estimate guard interval.

The determining unit 200 compares the first correlation value Rm[0] and the second correlation value Rm[τ] and determines the first case in which the first correlation value Rm[0] is larger by a pre-set magnification than the second correlation value Rm[τ], the second case in which the second correlation value Rm[τ] is larger by the pre-set magnification than the first correlation value Rm[0], and the third case which is not the first case nor the second case.

In this case, the second correlation value Rm[τ] means an influence of the echo channel. By determining the influence of the echo channel, degradation of performance that may be caused when there is no echo channel or when power is very low can be overcome.

The accumulating unit 300 accumulates the first correlation value Rm[0] by the pre-set symbol accumulation number in the event of the first case, accumulates the second correlation value Rm[τ] by the pre-set symbol accumulation number in the event of the second case, and accumulates a value obtained by adding the first correlation value Rm[0] and the second correlation value Rm[τ] by the pre-set symbol accumulation number in the event of the third case, The frequency offset estimating unit 400 estimates a frequency offset ($\hat{\epsilon}$) by using the correlation values accumulated by the accumulating unit 300.

As mentioned above, the frequency offset estimating unit 400 of the frequency offset estimating apparatus according to the embodiment of the present invention may obtain a frequency offset by using the correlation value from the determining unit 200 without using the accumulating unit 300. In this case, the accumulating unit 300 is not necessary. However, accumulating correlation values from the determining unit 200 by using the accumulating unit 300 enables more accurate frequency offset estimation.

With reference to FIGS. 3 and 4, a delay occurs between the first channel (main channel) and the second channel (echo channel). If time of the first channel is $\tau_0$ and time of the second channel is $\tau_1$, the difference ($\Delta\tau=\tau_0-\tau_1$) between the time $\tau_0$ of the first channel and the time $\tau_1$ of the second channel corresponds to a delay time between the two channels.

For example, if the length of the guard interval is $$\frac{N_{GI}}{2},$$

time ($\tau_1$) of the second channel would be $0.9*N_{GI}$.

With reference to FIGS. 3 to 5, if the length of the guard interval is $N_{GI}$, the correlating unit 100 may set the start point of the estimate guard interval as a middle point $$\left(\frac{N_{GI}}{2}\right)$$

of the reference guard interval.

With reference to FIGS. 3 to 6, the determining unit 200 determines the first case if a square value of the first correlation value Rm[0] is larger by double than a square value of the second correlation value Rm[τ], determines the second case if the square value of the second correlation value Rm[τ] is larger by double than the square value of the first correlation value Rm[0], and determines the third case if it does not fall under the first case nor the second case. This may be represented by Equation 2 shown below:

If $|Rm[0]|^2>2|Rm[\tau]|^2$, Output $Rm[0]$

If $|Rm[\tau]|^2>2|Rm[0]|^2$, Output $Rm[\tau]$

If else Output $Rm[0]+Rm[\tau]$  [Equation 2]

The accumulating unit 300 may set the symbol accumulation number for accumulating the first correlation value Rm[0] or the second correlation value Rm[τ] as 4 which corresponds to the pilot-repeated symbol number. By setting the symbol accumulation number as 4, the frequency offset can be more accurately estimated compared with a case where accumulating is not conducted.

The frequency offset estimating unit 400 takes an arc tangent for the correlation values accumulated by the accumulating unit 300, and multiplies $$\frac{1}{2\pi}$$

thereto to estimate the frequency offset ($\hat{\epsilon}$).

$$\hat{\epsilon} = \frac{1}{2\pi}\arctan(\text{correlation value}) \quad \text{[Equation 3]}$$

The frequency offset estimating method according to an embodiment of the present invention will now be described with reference to FIGS. 3 to 7.

With reference to FIG. 7, the frequency offset estimating method according to an embodiment of the present invention may include the correlating step (S100), the determining step (S200), the accumulating step (S300), and the frequency offset estimating step (S400).

In the correlating step S100, the first correlation value Rm[0] is obtained by correlating a known reference guard interval of an OFDM symbol and a reference copy interval corresponding to the reference guard interval, an estimate guard interval is set from a pre-set point of the reference guard interval, and a second correlation value Rm[τ] is obtained by correlating the estimate guard interval and an estimate copy interval corresponding to the estimate guard interval.

In the determining step S200, the first correlation value Rm[0] and the second correlation value Rm[τ] are compared to determine the first case in which the first correlation value Rm[0] is larger by a pre-set magnification than the second correlation value Rm[τ], the second case in which the second correlation value Rm[τ] is larger by the pre-set magnification than the first correlation value Rm[0], and the third case which is not the first case nor the second case.

In the accumulating step S300, in the event of the first case, the first correlation value Rm[0] is accumulated, in the event of the second case, the second correlation value Rm[τ] is accumulated, and in the event of the third case, a value obtained by adding the first correlation value Rm[0] and the second correlation value Rm[τ] is accumulated.

In the frequency offset estimating step S400, the frequency offset ($\hat{\epsilon}$) is estimated by using the correlation values accumulated in the accumulating step S300.

With reference to FIGS. 3 to 7, in the correlating step S100, when the length of the guard interval is $N_{GI}$, the start point of the estimate guard interval may be set as a middle point $$\left(\frac{N_{GI}}{2}\right)$$

of the reference guard interval.

With reference to FIGS. 3 to 7, in the determining step S200, if a square value of the first correlation value Rm[0] is larger by double than a square value of the second correlation value Rm[τ], it is determined as the first case, if the square value of the second correlation value Rm[τ] is larger by double than the square value of the first correlation value Rm[0], it is determined as the second case, and if it is not the first nor the second case, it is determined as the third case. This may be represented by Equation 2 as shown above.

In the accumulating step S300, the symbol accumulation number for accumulating the first correlation value Rm[0] or the second correlation value Rm[τ] may be set as 4 which corresponds to the pilot-repeated symbol number. By setting the symbol accumulation number as 4, the frequency offset can be more accurately estimated compared with a case where accumulating is not conducted.

In the frequency offset estimating step S400, an arc tangent is taken for the correlation values accumulated by the accumulating unit 300, to which $$\frac{1}{2\pi}$$

is multiplied to estimate the frequency offset ($\hat{\epsilon}$)

With reference to the graph of FIG. 8, it is noted that, with respect to the fixed two-path channel, the RMSE of the present invention is lower than that of the related art.

Namely, the fixed echo channel considered in FIG. 8 is a channel including two paths each with fixed power. 'Power=0.5:0.5' means that there is an echo, and the separately indicated power means power of an actually considered path.

From the graph of FIG. 8, it can be confirmed that the frequency offset estimating technique according to the present invention is superior to the existing method in an environment where there is an echo.

Also, with reference to the graph of FIG. 9, it is noted that the RMSE of the present invention is lower than that of the related art.

Namely, the time-varying echo channel in FIG. 9 is the same as that of FIG. 8 in the aspect that two channels exist, but different in that power of each path changes randomly and a Doppler frequency was considered.

Therefore, it can be said that the channel model applied to FIG. 9 is similar to an actual channel environment of a radio communication system.

As noted in the graph of FIG. 9, the frequency offset estimating technique of the present invention generates a power gain of more than 8 dB compared with the related art. In addition, the present invention satisfies the reference performance (RMSE=0.01), but the related art fails to do.

Therefore, from the results of the FIGS. 8 and 9, it can be noted that the frequency offset estimating technique according to the present invention exhibits excellent performance in the actual reception environment, compared with the related art frequency offset estimating technique.

As set forth above, the frequency offset estimating technique according to the exemplary embodiments of the invention has the advantage that the inter-symbol interference (ISI) can be minimized by accumulating the correlation values of the respective delay paths with effective power, and a frequency offset can be stably estimated by using the power-selective accumulation regardless of the presence or absence of an echo.

While the present invention has been shown and described in connection with the exemplary embodiments, it will be apparent to those skilled in the art that modifications and variations can be made without departing from the spirit and scope of the invention as defined by the appended claims.

What is claimed is:

1. A frequency synchronization apparatus in an OFDM system, the apparatus comprising:
a correlating unit that obtains a first correlation value by correlating a known reference guard interval of an OFDM symbol and a reference copy interval corresponding to the reference guard interval, sets an estimate guard interval from a pre-set point of the reference guard interval, and obtains a second correlation value by correlating the estimate guard interval and an estimate copy interval corresponding to the estimate guard interval;
a determining unit that compares the first and second correlation values to determine a first case where the first correlation value is larger by a pre-set magnification than the second correlation value, a second case where the second correlation value is larger by a pre-set magnification than the first correlation value, and a third case which is not the first case nor the second case; and
a frequency offset estimating unit that estimates a frequency offset by using a correlation value corresponding to any one of the first to third cases determined by the determining unit.

2. The apparatus of claim 1, wherein the correlating unit sets the pre-set point, a start point of the estimate guard interval, as a middle point of the reference guard interval.

3. The apparatus of claim 2, wherein the determining unit determines the first case if a square value of the first correlation value is larger by more than double than a square value of the second correlation value, determines the second case if the square value of the second correlation value is larger by more than double than the square value of the first correlation value, and determines the third case if it does not fall under the first case nor the second case.

4. The apparatus of claim 3, wherein the frequency offset estimating unit takes an arc tangent for correlation values accumulated by an accumulating unit, and multiplies $$\frac{1}{2\pi}$$

thereto to estimate the frequency offset.

5. A frequency synchronization apparatus in an OFDM system, the apparatus comprising:
a correlating unit that obtains a first correlation value by correlating a known reference guard interval of each OFDM symbol and a reference copy interval corresponding to the reference guard interval, sets an estimate guard interval from a pre-set point of the reference guard interval, and obtains a second correlation value by correlating the estimate guard interval and an estimate copy interval corresponding to the estimate guard interval;
a determining unit that compares the first and second correlation values to determine a first case where the first correlation value is larger by a pre-set magnification than the second correlation value, a second case where the second correlation value is larger by a pre-set magnification than the first correlation value, and a third case which is not the first case nor the second case;
an accumulating unit that accumulates the first correlation value by the pre-set symbol accumulation number in the event of the first case, accumulates the second correlation value by the pre-set symbol accumulation number in the event of the second case, and accumulates a value obtained by adding the first and second correlation values by the pre-set symbol accumulation number in the event of the third case; and
a frequency offset estimating unit that estimates a frequency offset by using the correlation values accumulated by the accumulating unit.

6. The apparatus of claim 5, wherein the correlating unit sets the pre-set point, the start point of the estimate guard interval, as a middle point of the reference guard interval.

7. The apparatus of claim 6, wherein the determining unit determines the first case if a square value of the first correlation value is larger by more than double than a square value of the second correlation value, determines the second case if the square value of the second correlation value is larger by more than double than the square value of the first correlation value, and determines the third case if it does not fall under the first case nor the second case.

8. The apparatus of claim 7, wherein the accumulating unit sets the symbol accumulation number for accumulating the first correlation value or the second correlation value, as 4.

9. The apparatus of claim 8, wherein the frequency offset estimating unit takes an arc tangent for the correlation values accumulated by the accumulating unit, and multiplies $$\frac{1}{2\pi}$$

thereto to estimate the frequency offset.

10. A frequency synchronization method in an OFDM system, the method comprising:
- a correlating step of obtaining a first correlation value by correlating a known reference guard interval of an OFDM symbol and a reference copy interval corresponding to the reference guard interval, setting an estimate guard interval from a pre-set point of the reference guard interval, and obtaining a second correlation value by correlating the estimate guard interval and an estimate copy interval corresponding to the estimate guard interval;
- a determining step of comparing the first and second correlation values to determine a first case where the first correlation value is larger by a pre-set magnification than the second correlation value, a second case where the second correlation value is larger by a pre-set magnification than the first correlation value, and a third case which is not the first case nor the second case;
- an accumulating step of accumulating the first correlation value in the event of the first case, accumulating the second correlation value in the event of the second case, and accumulating a value obtained by adding the first and second correlation values in the event of the third case; and
- a frequency offset estimating step of estimating a frequency offset by using the correlation values accumulated in the accumulating step.

11. The method of claim 10, wherein, in the correlating step, a pre-set point, a start point of the estimate guard interval, is set as a middle point of the reference guard interval.

12. The method of claim 11, wherein, in the determining step, if a square value of the first correlation value is larger by more than double than a square value of the second correlation value, it is determined to be the first case, if the square value of the second correlation value is larger by more than double than the square value of the first correlation value, it is determined to be the second case, and if it is not the first nor the second case, it is determined to be the third case.

13. The method of claim 12, wherein, in the accumulating step, the symbol accumulation number for accumulating the first correlation value or the second correlation value is set as 4.

14. The method of claim 13, wherein, in the frequency offset estimating step, an arc tangent is taken for the correlation values accumulated in an accumulating step, to which $$\frac{1}{2\pi}$$

is multiplied to estimate the frequency offset.

* * * * *